(12) United States Patent
Ersoy

(10) Patent No.: US 6,554,374 B1
(45) Date of Patent: Apr. 29, 2003

(54) TANDEM BRAKE BOOSTER FOR AUTOMOBILES

(75) Inventor: Metin Ersoy, Walluf (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/743,903
(22) PCT Filed: May 5, 2000
(86) PCT No.: PCT/DE00/01412
§ 371 (c)(1), (2), (4) Date: Jan. 11, 2001
(87) PCT Pub. No.: WO00/68054
PCT Pub. Date: Nov. 16, 2000

(30) Foreign Application Priority Data

May 12, 1999 (DE) .......................................... 199 21 945

(51) Int. Cl.[7] ........................ B60T 13/52; B60T 13/563; B60T 17/02; B60T 13/72
(52) U.S. Cl. .............................. 303/114.3; 188/DIG. 1; 188/356; 92/48; 303/113.4; 303/113.3
(58) Field of Search ........................... 303/114.3, 113.4, 303/113.3, 155; 188/DIG. 1, 356, 357; 91/367, 369.1–369.4, 391, 376 R, 511, 519, 521; 60/547.1, 545; 92/48

(56) References Cited

U.S. PATENT DOCUMENTS

| | | | |
|---|---|---|---|
| 3,556,608 A | * | 1/1971 | MacDuff et al. |
| 3,559,532 A | * | 2/1971 | MacDuff et al. |
| 4,576,004 A | * | 3/1986 | Bach ........................... 188/356 |
| 4,632,208 A | * | 12/1986 | Takayama et al. |
| 4,932,727 A | * | 6/1990 | Wagner et al. |
| 4,979,426 A | * | 12/1990 | Schiel et al. ................ 91/369.1 |
| 5,000,002 A | * | 3/1991 | Belart |
| 5,031,971 A | * | 7/1991 | Boehm et al. ............... 188/356 |
| 5,094,080 A | * | 3/1992 | Gautier et al. |
| 5,350,225 A | * | 9/1994 | Steiner et al. ........... 303/113.4 |
| 5,779,329 A | * | 7/1998 | Takeshima ................ 303/114.3 |
| 5,890,775 A | * | 4/1999 | Tsubouchi et al. ........ 303/114.3 |
| 5,984,429 A | * | 11/1999 | Nell et al. ................... 303/155 |
| 5,992,947 A | * | 11/1999 | Tsubouchi ............... 303/114.3 |
| 6,213,569 B1 | * | 4/2001 | Tsubouchi ............... 303/114.3 |

FOREIGN PATENT DOCUMENTS

| | | |
|---|---|---|
| DE | 197 41 376 A1 | 4/1999 |
| DE | 19921945 | * 12/2000 |
| JP | 60 258 39 A | 2/1985 |
| WO | 0068054 | * 11/2000 |

* cited by examiner

Primary Examiner—Douglas C. Butler
(74) Attorney, Agent, or Firm—McGlew and Tuttle, P.C.

(57) ABSTRACT

A motor vehicle tandem brake power booster with two booster units each including a vacuum chamber and a working chamber each arranged in a partition divided housing. The pressure difference between the pressure in the vacuum chamber and the pressure that can be influenced by a switching device in the corresponding working chamber in each booster unit acts on a piston separating the vacuum chamber from the working chamber. The forces, which are proportional to the pressure difference and act on the pistons are bundled via mechanical intermediate members by at least one transmission element each with the forces applied by the driver of the vehicle to a corresponding brake pedal. The switching device has a first on-off valve (16) actuated directly by the corresponding brake pedal (3) for admitting pressure to the working chamber (13) of one of the two booster units (10) and a second on-off valve (7) controllable as a function of the pedal forces applied to the brake pedal (3), the speed with which the pedal is actuated for admitting pressure into the working chamber (23) of the additional booster unit (20).

7 Claims, 1 Drawing Sheet

TANDEM BRAKE BOOSTER FOR AUTOMOBILES

FIELD OF THE INVENTION

The present invention pertains to a tandem brake power booster for motor vehicles with two booster units comprising a vacuum chamber and a working chamber each, which are arranged in a housing and are separated by a partition, wherein the pressure difference between the pressure in the vacuum chamber and the pressure that can be influenced by a switching device in the corresponding working chamber acts in each booster unit on a piston separating the vacuum chamber and the working chamber and the forces which act on the pistons and are proportional to the pressure difference are bundled via mechanical intermediate members with the forces applied to a corresponding brake pedal by a vehicle driver by means of at least one transmission element each.

BACKGROUND OF THE INVENTION

Brake power boosters of the above-described type of this class are used in the automobile industry in motor vehicles wherever high brake powers are to be obtained with weak pedal forces. Tandem arrangements are used where an enlargement of the piston diameter of a brake power booster provided with only one booster unit is not possible because of space limitations. Tandem brake power boosters with two booster units arranged one behind the other achieve an increase in the brake power by about 20% at a housing external diameter of 200 mm compared with a single brake power booster with a housing external diameter of 250 mm, and it should be borne in mind that the brake power boosters operated, in principle, with the vacuum of the engine of the motor vehicle bring about, in general, a boosting of the brake pedal forces by a factor of up to 5.

The boosting of the brake power takes place in the tandem brake power boosters known from the prior art, in general, during each braking operation, even when a great increase in the brake power is not necessary for the intended braking operation at all. This property of prior-art brake power boosters is especially highly pronounced in tandem brake power boosters and it adversely affects the ability of the braking power to be metered.

SUMMARY AND OBJECTS OF THE INVENTION

The object of the present invention is therefore to further improve a tandem brake power booster of this class such that the power boosting, which can be achieved by the tandem brake power booster, is made available only when a great braking deceleration is necessary.

This object is accomplished according to the present invention by the switching device having a first on-off valve actuated directly by the corresponding brake pedal for admitting pressure to the working chamber of one of the two booster units and a second on-off valve controllable as a function of the pedal power applied to the brake pedal and the speed with which the pedal is actuated for admitting pressure to the working chamber of the second booster unit.

Admission of pressure to the second working chamber independently from the working chamber of the first booster unit is brought about by this solution.

The pedal power acting on the brake pedal and additionally the speed with which the pedal is actuated are decisive criteria for when the driver of the vehicle wishes to perform a normal braking or an emergency or panic braking. Depending on these two values, which can be determined by means of sensors at the brake pedal, it is thus possible to control whether only one booster unit is needed for a braking operation or whether correspondingly higher power, which is necessary for an emergency or panic braking, is to be applied to the brake system.

In addition to the first booster unit, pressure is also admitted in the second case to the additional booster unit acting independently from the first booster unit through the connected on-off valve. Thus, sufficiently high actuating forces are available for the braking operation in cases in which they are necessary; on the other hand, the ability of the brake system to meter the power is not affected adversely during normal operations. The separate actuation of the additional booster unit as a function of the pedal power and the speed with which the pedal is actuated can also be used if the corresponding motor vehicle has an electronic brake assist. This technical means is an electronic control unit which additionally recognizes whether the driver of the vehicle again reduces the pedal power during an emergency braking because of special circumstances and thus brings about an unintended increase in the braking distance. In such a case, the recognition and the evaluation of the braking operation by the brake assist can also contribute to the supply of the necessary brake power due to the design of the tandem brake power booster according to the present invention.

A particularly inexpensive and reliable design of the second on-off valve controllable as a function of the pedal power applied to the brake pedal and the speed with which the pedal is actuated for admitting pressure to the working chamber of the additional booster unit is obtained by this valve being actuated electromagnetically.

An exemplary embodiment of the subject of the present invention will be explained below in greater detail on the basis of the drawing attached.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only figure is a sectional side view of a tandem brake power booster according to the present invention, in which the view is selected such that the brake power booster is shown in the non-operative state in the upper part of the figure, whereas the lower part of the figure shows the state of the brake power booster with the brake pedal depressed, as it happens, e.g., in the case of an emergency or panic braking.

DESCRIPTION OF THE PREFERRED EMBODIMENT

Figure 1:
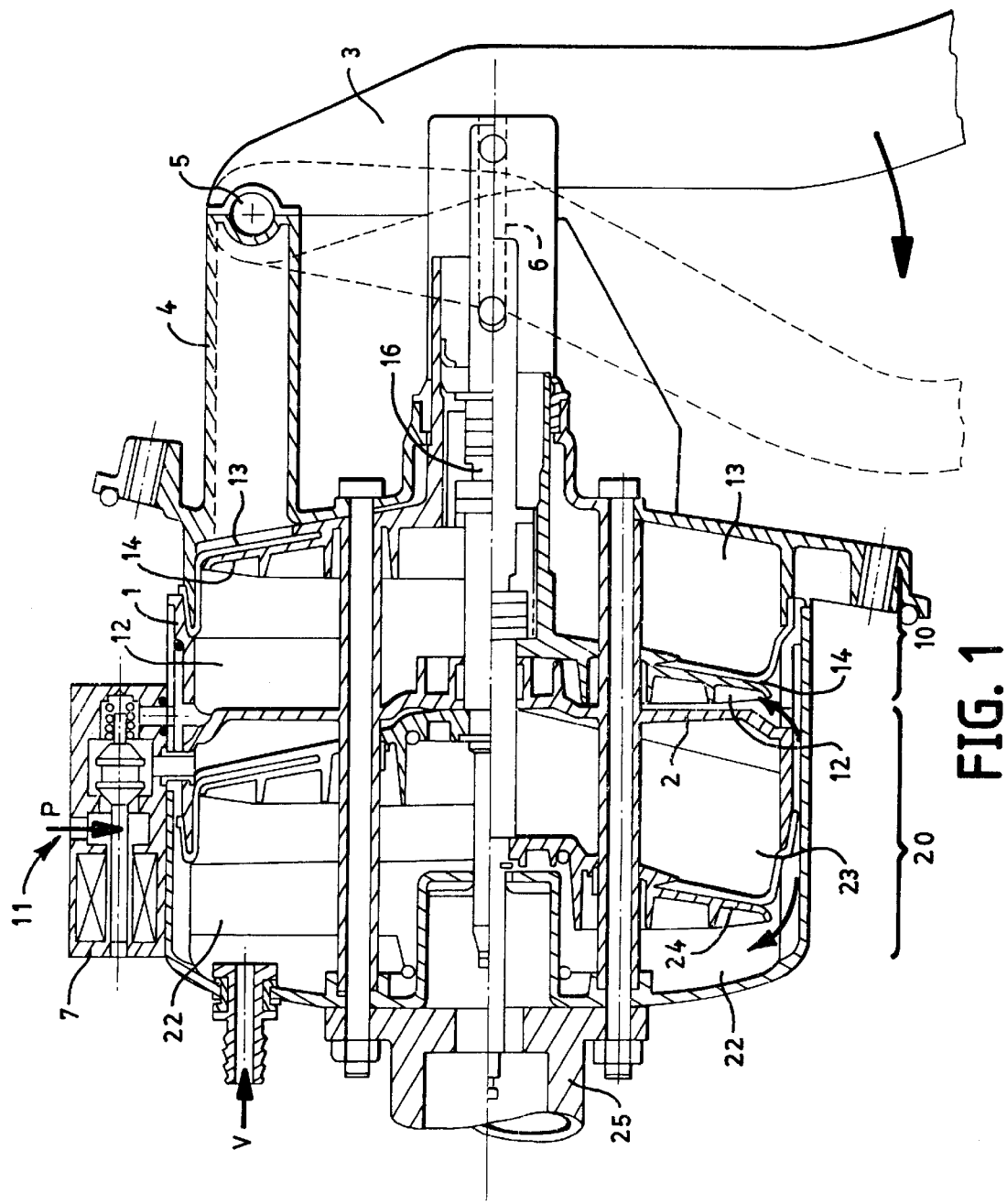

Referring to the drawings in particular, the exemplary embodiment of the brake power booster according to the present invention has a housing 1, which surrounds an inner space divided by a partition 2. Each of the partial areas of the inner space represents an independent booster unit 10 and 20, respectively. The booster unit 10 has a vacuum chamber 12 as well as a working chamber 13. The two chambers 12 and 13 are separated gas-tightly by a piston 14. In the non-operative position of the tandem brake power booster, the vacuum chamber 12 has a large volume, whereas the working chamber 13 has a very small volume, as is clearly apparent from the upper part of the figure. Via a brake pedal 3, which is connected to the brake power booster and is pivotably fixed on a bracket 4 in a bearing unit 5, a plunger rod 6 actuates a first on-off valve 16, which admits atmospheric pressure into the working chamber 13 in the conventional manner in the case of a braking operation.

Analogously to the booster unit 10, the booster unit 20 also has a vacuum chamber 22, a working chamber 23 as well as a piston 24 separating the two chambers. In the non-operative state of the tandem brake power booster, the vacuum chamber 22 likewise has a large volume, whereas the volume of the working chamber 23 is very small. Vacuum generated by the engine of the motor vehicle is admitted into both chambers 22, 23 in the non-operative state, and a second on-off valve 7 admits atmospheric pressure into the working chamber 23 if the values of the pedal power and the speed with which the pedal is actuated are above a predetermined threshold value characteristic of emergency or panic braking. The on-off valve 7 is actuated electromagnetically and establishes a connection between the vacuum chamber 12 of the first booster unit 10, which is actuated directly by the brake pedal-actuated on-off-valve 16, and the working chamber 23 of the additional booster unit, which is actuated as a function of the pedal power and the speed with which the pedal is actuated, in the non-operative state shown in the upper part of the drawing.

Sensors, not shown specifically, e.g., contactless Hall sensors, which measure the actuating, forces as well as the pedal actuation angle of the brake pedal 3, and located within the bearing unit 5 in this exemplary embodiment, and the speed with which the pedal is actuated can be determined from the pedal actuation angle without problems. The measured values are sent to a corresponding electronic evaluating circuit, which actuates the on-off valve 7 on the outside of the brake power booster housing 1 as a unction of the measured values. The on-off valve 7 is a 3-2-way solenoid valve in this exemplary embodiment, which establishes a connection between the ambient air pressure present at the connection 11 and the working chamber 23 when necessary at predefined values of the actuating forces measured at the brake pedal and of the pedal actuation angle.

If the evaluating circuit determines for the measured pedal forces and the speed with which the pedal is actuated that these are within the range of a normal braking, ambient pressure is admitted into the working chamber 13 of the first booster unit 10 in the conventional manner and boosting of the brake forces applied by the driver of the vehicle is thus brought about. This boosting of the brake forces of the first booster unit 10 is fully sufficient for normal braking.

Vacuum continues to be admitted in this case into both the working chamber 23 belonging to the second booster unit and to the vacuum chamber 22 as in the non-operative state, so that the piston 24 located between them moves along, without generating a boosting effect, because it has a non-positive connection with the plunger rod 6.

If the evaluating circuit for the pedal forces and the speed with which the pedal is actuated determines that these are in the range that characterizes an emergency or panic braking, ambient pressure is also admitted, contrary to the normal braking, into the working chamber 23 of the second booster unit by the on-off valve 7. The admission of ambient pressure into both working chambers 13 and 23 causes the respective pistons 14 and 24 of the respective booster units 10 and 20, into which pressure is admitted, to be displaced in the forward direction to the side facing away from the brake pedal 3. These generated pressing forces of the two pistons are transmitted via mechanical intermediate members to the plunger rod 6 and from this farther to a main brake cylinder 25, which is connected to the tandem brake power booster and is not shown here specifically, and which in turn passes on hydraulic fluid to the individual brakes of the motor vehicle.

Due to the on-off valve 7 being actuated as a function of the measured pedal forces and the speed with which the pedal is actuated, good metering and sufficient braking power are thus ensured for all braking operations mentioned, i.e., both normal braking and panic braking.

While specific embodiments of the invention have been shown and described in detail to illustrate the application of the principles of the invention, it will be understood that the invention may be embodied otherwise without departing from such principles.

What is claimed is:

1. A motor vehicle tandem brake power booster, comprising: two booster units each comprising a switching device, a partition divided housing with a vacuum chamber and a working chamber, mechanical intermediate members, a piston separating the vacuum chamber from the working chamber wherein a pressure difference between a pressure in the vacuum chamber and a pressure that can be influenced by the switching device in a corresponding said working chamber in each booster unit acts on the piston separating the vacuum chamber from the working chamber and forces, which are proportional to the pressure difference and act on respective said pistons are bundled via the mechanical intermediate members by at least one transmission element each with forces applied by a driver of the vehicle to a corresponding brake pedal, the switching device of a first said booster unit having a first on-off valve actuated directly by the brake pedal for admitting pressure to the working chamber of said first booster unit and said switching device of a second of said booster units including a second unit on-off valve controllable as a function of pedal forces applied to the brake pedal and a speed with which the pedal is actuated for admitting pressure into the working chamber of the second booster unit, said working chamber of said second booster unit being isolated from said working chamber of said first booster unit.

2. A tandem brake power booster for motor vehicles in accordance with claim 1, said second unit on-off valve is controllable as a function of the pedal forces applied to the brake pedal and the speed with which the pedal is actuated is actuated electromagnetically.

3. A tandem brake power booster for motor vehicles in accordance with claim 2, wherein said second unit on-off valve is a 3-2-way solenoid valve.

4. A tandem brake power booster for motor vehicles in accordance with claim 1, wherein said second unit on-off valve is actuated only when the pedal forces applied to said brake pedal and the speed with which the pedal is actuated exceed a predetermined threshold value.

5. A tandem brake power booster for motor vehicles in accordance with claim 1, the second unit switching device valve establishes a connection between the vacuum chamber of the first booster unit and the working chamber of the second booster unit, which is actuated by the pedal forces and the speed with which the pedal is actuated when values of the pedal forces applied to the brake pedal and of the speed with which the pedal is actuated are below a predetermined threshold value.

6. A booster in accordance with claim 1, wherein:

said working chamber of said first booster unit is not connected to said working chamber of said second booster unit.

7. A booster in accordance with claim 1, wherein:

said second booster unit maintains a vacuum in said working chamber of said second booster unit when said switching device of said first booster unit admits pressure to said working chamber of said first booster unit.

* * * * *